(No Model.) 4 Sheets—Sheet 1.
C. H. LITTLE.
CASH INDICATOR AND REGISTER.
No. 575,000. Patented Jan. 12, 1897.
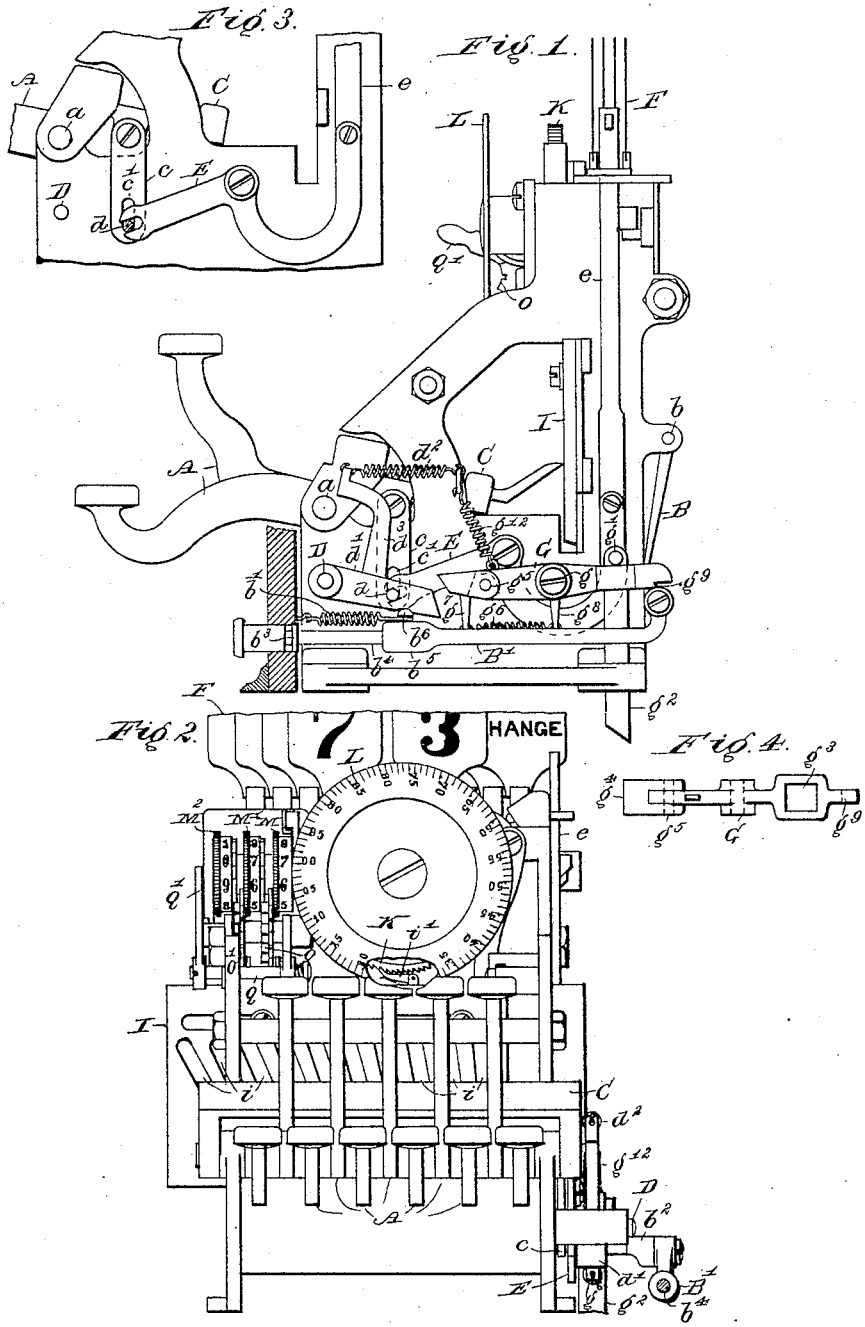

(No Model.) 4 Sheets—Sheet 2.

C. H. LITTLE.
CASH INDICATOR AND REGISTER.

No. 575,000. Patented Jan. 12, 1897.

WITNESSES.
Kirkley Hyde
Agnes Bailey

INVENTOR
Charles H. Little,
BY Albert M. Moore,
His ATTORNEY.

(No Model.) 4 Sheets—Sheet 3.
C. H. LITTLE.
CASH INDICATOR AND REGISTER.
No. 575,000. Patented Jan. 12, 1897.
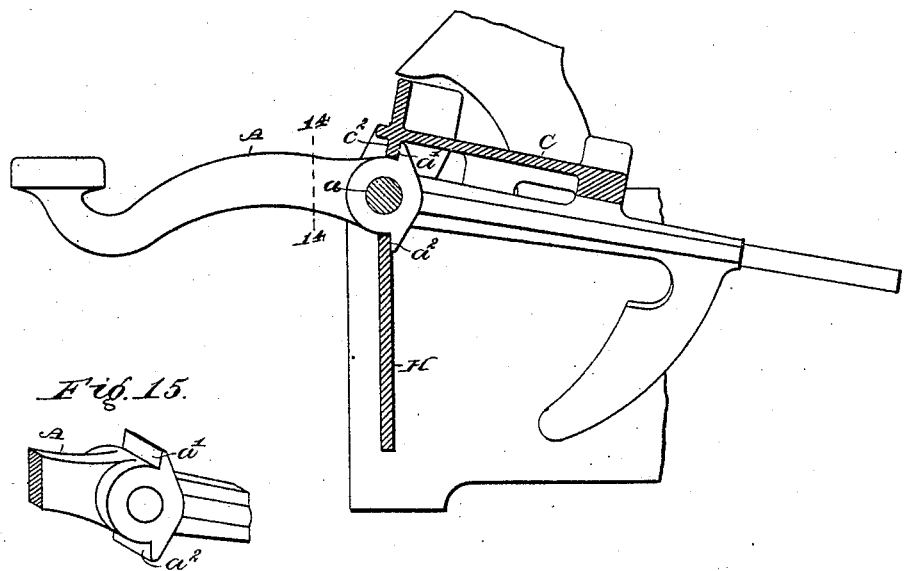
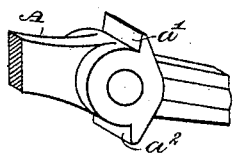
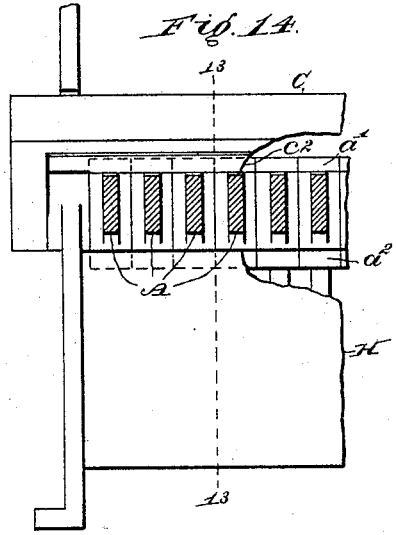
WITNESSES.
Kirtley Hyde.
Agnes Bailey
INVENTOR
Charles H. Little,
BY Albert M. Moore,
His ATTORNEY.

(No Model.) 4 Sheets—Sheet 4.
C. H. LITTLE.
CASH INDICATOR AND REGISTER.
No. 575,000. Patented Jan. 12, 1897.
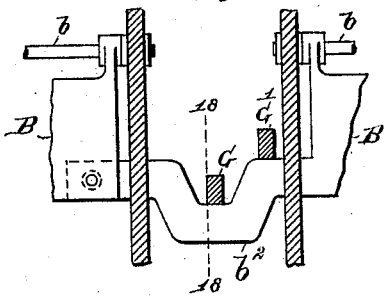
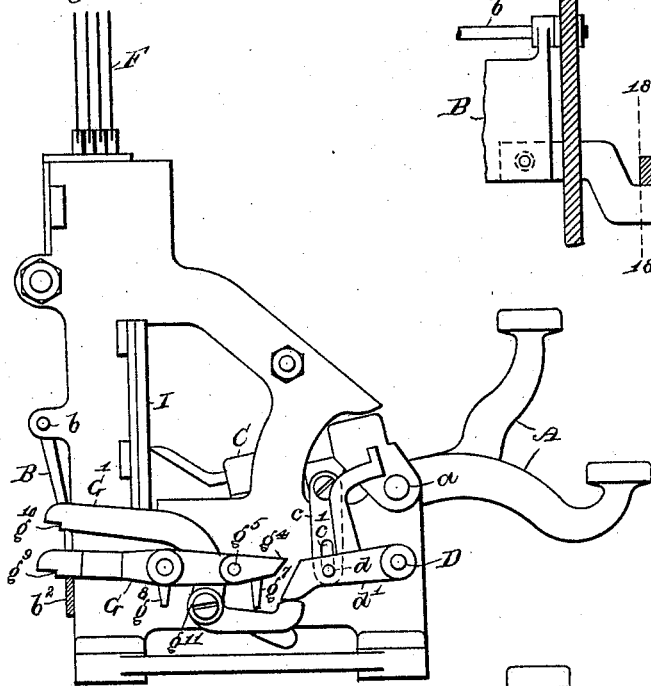
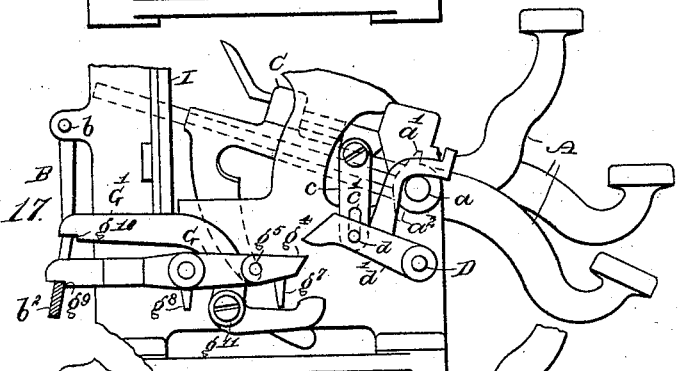
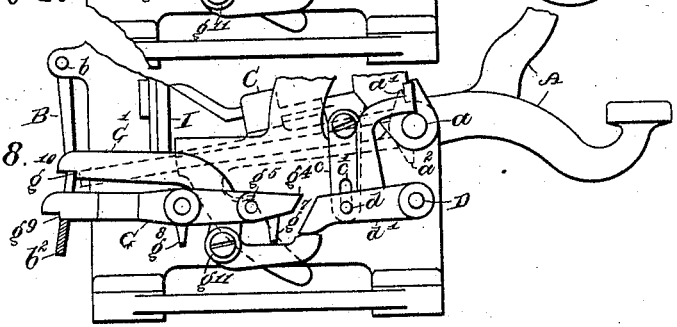
WITNESSES.
Kirkley Hyde.
Agnes Bailey.
INVENTOR
Charles H. Little,
By Albert M. Moore,
His ATTORNEY.

UNITED STATES PATENT OFFICE.

CHARLES H. LITTLE, OF MELROSE, MASSACHUSETTS, ASSIGNOR, BY MESNE ASSIGNMENTS, TO ROBERT F. HERRICK, TRUSTEE, OF BOSTON, MASSACHUSETTS.

CASH INDICATOR AND REGISTER.

SPECIFICATION forming part of Letters Patent No. 575,000, dated January 12, 1897.

Application filed June 11, 1894. Serial No. 514,191. (No model.)

*To all whom it may concern:*

Be it known that I, CHARLES H. LITTLE, a citizen of the United States, residing at Melrose, in the county of Middlesex and Commonwealth of Massachusetts, have invented a certain new and useful Improvement in Cash Indicators and Registers, of which the following is a specification.

My invention relates to cash indicators and registers; and it consists in the devices and combinations hereinafter described and claimed, the objects of said invention being to provide means simpler than those heretofore used for locking the keys to prevent the operation of the register, either wholly during the absence of the person in charge or until the manipulation of a push-rod, which is partly external to the case of the register; also means for lessening the friction and wear of the locking bar and keys upon each other, the invention in the two respects last named being an improvement on the invention shown and described in the United States Patent to Range, No. 479,334, dated July 19, 1892; also means to prevent operating the register by a wire or rod introduced into the openings through which the keys enter the case, and means of disengaging the numbered registering wheels or pinions, in order that said numbered wheels may be readily turned to their zero positions.

Figure 5:
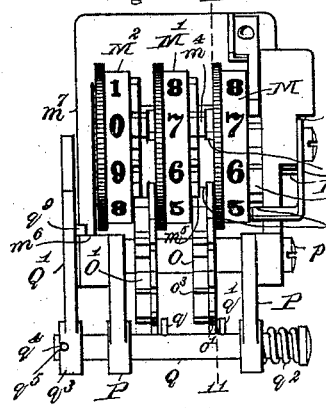
Figure 6:
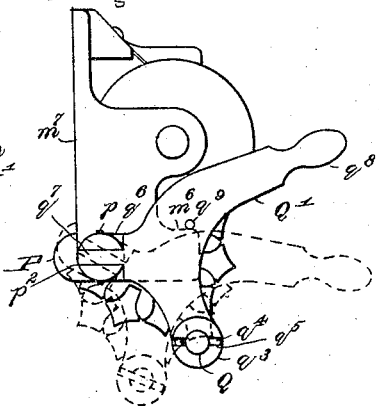
Figure 7:
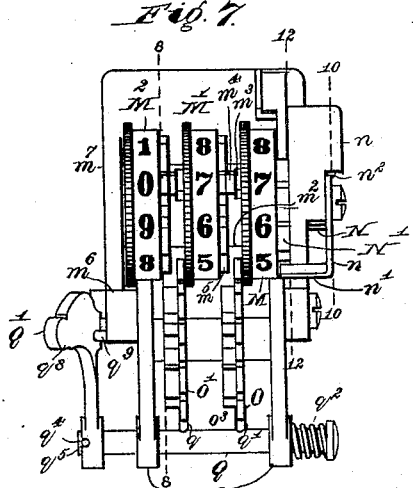
Figure 8:
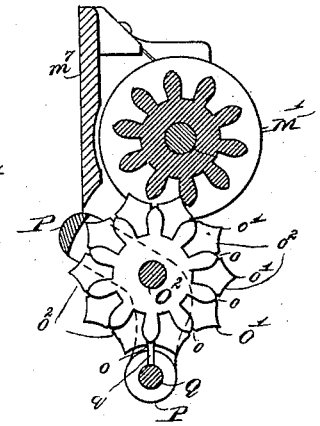
Figure 9:
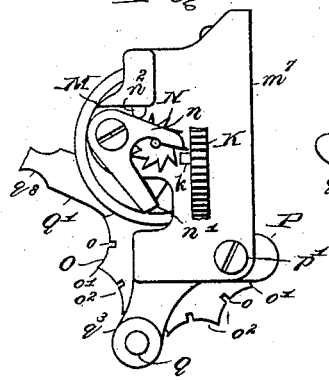
Figure 12:
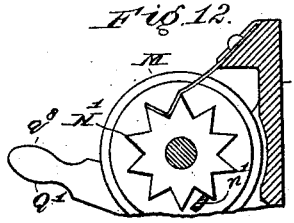
Figure 10:
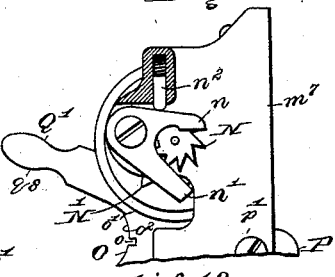
Figure 11:
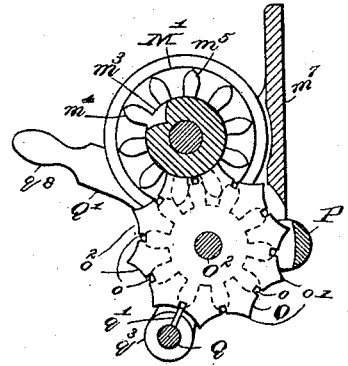

In the accompanying drawings, on four sheets, Figure 1 is a right side elevation of such parts of a cash indicator and register provided with my improvement as are necessary to the explanation of my invention; Fig. 2, a front elevation of the same; Fig. 3, a right side elevation of a part of the frame, part of a key, the rock-plate, link, and tag-releasing lever; Fig. 4, a plan of a part of the drawer-unlocking lever; Fig. 5, a front elevation of the registering-wheels in their operative positions with their releasing devices; Fig. 6, a left side elevation of the parts shown in Fig. 5, showing also in dotted lines the releasing-lever and intermediate registering-wheels in their releasing position; Fig. 7, like Fig. 5, except that in Fig. 7 the intermediate registering-wheels are turned out of engagement with the numbered registering-wheels; Fig. 8, a vertical section on line 8 8 in Fig. 7; Fig. 9, a right side elevation of the devices shown in Fig. 5; Fig. 10, a vertical section on the line 10 10 in Fig. 7; Fig. 11, a vertical section on the line 11 11 in Fig. 5; Fig. 12, a vertical section on the line 12 12 in Fig. 7; Fig. 13, a vertical section on the line 13 13 in Fig. 14 of the key-rod, rocking-plate, and stationary guard-plate, showing a key-lever in side elevation; Fig. 14, a front elevation of the parts shown in Fig. 13, the key-levers being in a vertical section on the line 14 14 in Fig. 13; Fig. 15, an isometric perspective view of the hub and adjacent parts of a key-lever, showing the key-guards; Fig. 16, a left side elevation of the parts shown in Fig. 1, including the drawer-unlocking lever, together with the auxiliary lever, both of said levers being out of engagement with the locking-bar; Fig. 17, like Fig. 16, except that the locking-bar is held out of engagement with the keys by the drawer-unlocking lever; Fig. 18, like Fig. 16, except that the auxiliary lever is in engagement with the key-locking bar; Fig. 19, a front elevation of portions of two adjacent key-locking plates, means by which they are connected to each other, the drawer-unlocking lever, the auxiliary lever, and two adjacent sides of the frames of two adjacent banks of keys, said frames and levers being in vertical sections.

Above the rear end portions of all the key-levers A extends a wing or locking-bar B, pivoted at its upper edge on a rod $b$, the lower edge of said locking-bar being normally held over all said key-levers by gravity or by the force of a spring $b'$, which is represented as a spiral spring connecting the horizontal push-rod B' and the frame of the machine, the rear end of said push-rod being jointed to an arm $b^2$, which extends laterally from the lower part of said locking-bar. Hence the depression of the key-levers and any operation of the machine is normally prevented by the locking-bar. Said locking-bar may be pushed backward (to the right in Fig. 1) out of engagement with the key-levers by means of the push-rod and may be held in either of its positions by means of a lock operated by a key and having a bolt which engages notches in said push-rod, substantially as shown in said patent to Range, or preferably engages the front and rear sides of a collar $b^3$, fixed on said push-rod. When the bolt of the lock is in engagement with the rear face of said collar $b^3$, the key-levers can only be operated after withdrawing said bolt by the key of the lock and forcing back the push-rod, but when said bolt is in engagement with the front face of said collar $b^3$ any key-lever may be operated. Usually the lock is unlocked and the push-rod must be forced backward after each depression of a key-lever and the return of said key-lever to its normal position.

For convenience of adjustment the push-rod may be made in two parts $b^4$ $b^5$, one of which, $b^5$, is tubular and receives the other part, the latter being held in place by a set-screw $b^6$, which turns radially in the part $b^5$ and thrusts against the part $b^4$.

A rock-plate C of the usual construction, except as hereinafter described, extends over all the key-levers of the same bank and is raised by the depression of any key-lever of said bank and has pivoted to it a downhanging link $c$, substantially as shown in said patent to Range and in a well-known manner. Said link $c$ has the usual slot $c'$, which receives a pin or lateral projection $d$ from an arm $d'$, which is thereby raised on the rising of the rock-plate C, there being at least one arm $d'$ for each two banks of key-levers, each arm being secured to a rock-shaft D common to all said banks and the slot $c'$ extending upward far enough to allow any arm $d'$ to be raised without raising the corresponding rock-plate. The rear end of the arm $d'$ is thrown down by a spiral spring $d^2$, connecting an upward projection $d^3$ from said arm and the frame of the machine.

The raising of the free end of the arm $d'$ operates a lever E, which by means of the rod $e$ operates to release the raised tags F in the usual manner, the front end of said lever E having a slot which engages the pin $d$.

The drawer-unlocking lever G is pivoted at $g$ to the frame of the machine and extends beyond the rear ends of the key-levers and has pivoted to it at $g'$, back of the pivot $g$, a bolt $g^2$, which engages the front face of the back of the drawer (not shown) in the usual manner and holds the drawer in the case, so that raising the rear end of the lever G unlocks the drawer. The pivot $g'$ is fast in the bolt $g^2$, which passes loosely down through a vertical slot $g^3$ in said lever G until said pivot rests on the top of said lever G. The front end of the lever G is normally raised by the said spiral spring $g^{12}$, stretched between said lever and the frame of the machine. The drawer-unlocking lever G is provided at its front end with a trip or nose $g^4$, secured to the body of said lever by a rule-joint $g^5$, of ordinary construction, which allows said nose to be raised without turning said lever G upon its pivot $g$, but which limits the downward movement of said nose upon said lever.

The adjacent ends of the arm $d'$ and the nose $g^4$ are beveled to slide easily upon each other when the rear end of said arm is raised against the front end of said nose $g^4$. The free end of the arm $d'$ when raised by the depression of any key rises and passes above the nose $g^4$, which immediately after falls by its own weight or, preferably, is drawn down by the contraction of a spiral spring $g^6$ (the ends of which are attached to downward projections $g^7$ $g^8$ on said nose and said lever G, respectively, as shown in Fig. 1) until the adjacent ends of said nose and lever G abut. When the rear end of the arm $d'$ falls, upon the release of the depressed key-lever, said arm presses upon said nose $g^4$ and raises the rear end of said lever G, drawing the bolt $g^2$. The rear end of the lever G reaches over the arm $b^2$ of the locking-bar B and is provided with a shoulder $g^9$, against which said arm $b^2$ strikes when the rod B' is pushed back far enough and let go, said shoulder $g^9$ then preventing said locking-bar from swinging forward over the key-levers, as shown in Fig. 17. When the locking-bar is thus held out of engagement with the key-levers, any key-lever may be depressed; but when the key is returned to position the rear end of the drawer-unlocking lever G is raised by the descent of the arm $d'$, as above described, high enough to allow said locking-bar arm $b^2$ to swing forward past said shoulder, locking all the key-levers until said arm $b^2$ is, by means of the push-rod, forced back of said shoulder $g^9$. Hence when the push-rod is unlocked and free to move said push-rod must be forced backward after each depression of a key-lever. To lessen wear and friction of the keys on the locking-bar, an auxiliary lever G', Figs. 16 to 19, may be used, the rear part of which reaches over the arm $b^2$ of the locking-bar and is provided with a shoulder $g^{10}$, (like the shoulder $g^9$ of the drawer-unlocking lever G and having the same function,) which engages said arm $b^2$ after said lever G has been disengaged therefrom and holds said locking-bar out of contact with said key-levers until the return movement of the depressed key-lever and the arm $d'$ are more nearly completed, the front end of said auxiliary lever G' being arranged lower than the lowest position of the nose $g^4$. The auxiliary lever G' is pivoted at $g^{11}$ on the frame of the machine and is normally held down upon the arm $b^2$ by the greater weight of the part of said lever G' being back of the pivot $g^{11}$.

In order to prevent tampering with the machine by means of wires introduced into the openings in the case through which the key-levers A project, the otherwise cylindrical hubs of said levers (which are arranged close together on their fulcrum-rod $a$ in the usual manner) are each provided with two guards $a'$ $a^2$, Figs. 13, 14 and 15, one above and one below each hub, each guard having the same lateral thickness as the hub to which it is secured, the front faces of the guards resting, when the key-levers are in their normal positions, the lower against the rear face of the stationary vertical guard-plate H (which, as usual, is placed below the hubs of the key-levers) and the upper against the rear of a downwardly-projecting rib $c^2$, which extends along the under side of the rock-plate C. This construction allows of less care and expense in finishing and fitting the key-levers, plate H, and rock-plate, and prevents the operation of the registering devices by anything introduced between said plate H and rock-plate.

The rear ends of the key-levers are represented (Figs. 1 and 2) as entering the variably-inclined slots $i$ of a reciprocatory cam-plate I, similar to what is shown in United States patent to Koch, No. 505,553, dated September 26, 1893, the inclination of the slots being such as to give to said cam-plate a lateral movement corresponding in amount to the value of the key-lever by which the said movement is effected. A pawl $i'$, carried by said cam-plate, engages a ratchet-wheel K, represented as having one hundred teeth and intended to be given a complete revolution by one hundred depressions of the one-cent key-lever. The ratchet K and a disk L, divided into one hundred equal numbered annular intervals, are fast on the same shaft, the number of cents registered being read from said disk L. The ratchet K is provided with a pin $k$, which at every complete revolution of said ratchet engages a ten-toothed ratchet N, Figs. 9 and 10, and causes the latter to make one-tenth of a revolution, causing also a ten-toothed star-wheel $N'$ and the numbered dollar-registering wheel M, both secured on the same shaft with said ratchet N, each to make one-tenth of a revolution.

Over-registration is prevented by a U-shaped pawl $n$, Fig. 9, which is raised by being struck by the pin $k$ at the same time that said pin engages the ratchet N, causing the tooth $n'$ of said pawl to enter a notch of said star-wheel N. (See Figs. 5, 7, 9, 10, and 12.)

The hub $m^2$ of the dollar-registering wheel M is provided with a gap $m^3$ and with a single tooth $m^4$, which once in every revolution of said wheel M engages the ten-toothed pinion $o^3$, Figs. 8 and 9, concentric with and fast on the intermediate registering-wheel or stop-wheel O, and moves said wheel O one-tenth of a revolution, said gap $m^3$ being arranged with reference to said tooth $m^4$ in such a manner as to permit the projecting parts $o'$ of said wheel O to enter said gap when said tooth $m^4$ engages said pinion $o^3$. At other times the hub $m^2$ is in one of the concavities $o^2$ of the wheel O and prevents the rotation of the latter. Said ten-toothed pinion $o^3$ engages a similar pinion $m^5$, fast on the hub of the ten-dollar-registering wheel $M'$.

The numbered registering-wheel $M'$ in all other respects is like the wheel M, and in a similar manner operates the intermediate wheel $O'$, which is precisely like the wheel O, and, by similar means, once in every complete revolution of the wheel $M'$ causes the hundred-dollar-registering wheel to make one-tenth of a revolution. The wheels O O' are loose on their shaft $O^2$, and turn independently of each other.

The registering apparatus, so far as above described, is not of my invention.

The wheels O O', with their shaft $O^2$, are carried in a frame P, shaped like three sides of a hollow square, which turns on pivot-screws $p\ p'$ in such a manner that the common axis of said wheels is always parallel with the common axis of the wheels M $M'$ $M^2$. In said frame P, below said wheels O O' and parallel with the shaft $O^2$, is arranged a sliding rod Q, provided with two radial parallel projections $q\ q'$, arranged at the same distance apart as said wheels O O' and each adapted to engage a notch $o$ of one of said wheels, but normally held out of such engagement by a spring $q^2$, compressed between the outside of the frame P and a fixed collar, with which an end of said rod Q is provided. The other end of the rod Q is surrounded by an arm $q^3$ of a three-armed lever $Q'$, said arm $q^3$ being retained on said rod by a pin $q^4$, projecting from said rod into a slot $q^5$ in said arm in such a manner as to allow said arm to vary slightly its angle with said rod. The lever $Q'$ is represented in Fig. 7 as slightly turned about its longitudinal axis or the axis of its arm $q^3$. Another arm $q^6$ of said lever $Q'$ terminates in a pin $q^7$, which enters a slot $p^2$ in the head of the pivot-screw $p$, and the third arm $q^8$ serves as a handle by which the frame P may be turned to swing the intermediate wheels O O' out of engagement with the numbered registering-wheels M $M'$ $M^2$. When the intermediate wheels O O' are in engagement with the numbered wheels M $M'$ $M^2$, they are prevented from disengagement by a pin $q^9$, which projects laterally from the lever Q above a part $m^6$ of the stationary frame $m^7$, which supports said numbered wheels.

By moving the handle laterally (to the left in Figs. 5 and 7 and toward the observer in Fig. 6) and downward the intermediate wheels O O' are prevented from turning on their shaft $O^2$ until restored to position, when said intermediate wheels will readily engage said numbered wheels, which in the meantime have been turned to their zero positions, and at the same time the rod Q releases said wheels O O'. Fig. 19 shows an obvious means of connecting the locking-rods of adjacent banks of keys to enable said rods to be manipulated by one push-rod.

I claim as my invention—

1. In a cash-register, the combination of a key, a locking-bar, normally engaging said key and preventing the operation thereof, a lever, adapted to engage said locking-bar to hold said bar out of engagement with said key, and an arm raised by the registering movement of said key and depressed when said key returns to position and adapted in the beginning of its downward movement to disengage said lever from said locking-bar and an auxiliary lever, adapted to engage said locking-bar when said first-named lever is disengaged therefrom, and to prevent the engagement of said bar with said key until the return movement of said key is nearly completed, said auxiliary lever being adapted to be disengaged from said locking-bar in the latter part of the downward movement of said arm, as and for the purpose specified.

2. In a cash-register, a key-lever having a hub provided with guards projecting therefrom above and below said hub, in combination with a guard-plate and with a rock-plate arranged above said key-lever and having a downhanging projection against which one of said guards bears, as and for the purpose specified.

In witness whereof I have signed this specification, in the presence of two attesting witnesses, this 5th day of June, A. D. 1894.

CHARLES H. LITTLE.

Witnesses:
   ALBERT M. MOORE,
   JEROME J. WEBSTER.